US 7,492,778 B2

(12) United States Patent
Gresham

(10) Patent No.: US 7,492,778 B2
(45) Date of Patent: Feb. 17, 2009

(54) DATA MEMORY EXTENSION FOR USE IN DOUBLE BUFFERED TDM SWITCHES

(75) Inventor: Paul Gresham, Ontario (CA)

(73) Assignee: Zarlink Semiconductor Inc., Kanata (CA)

( * ) Notice: Subject to any disclaimer, the term of this patent is extended or adjusted under 35 U.S.C. 154(b) by 954 days.

(21) Appl. No.: 10/864,136

(22) Filed: Jun. 9, 2004

(65) Prior Publication Data

US 2006/0198384 A1    Sep. 7, 2006

(30) Foreign Application Priority Data

Jun. 17, 2003   (GB) ................ 0313986.2

(51) Int. Cl.
*H04J 3/02* (2006.01)
*H04J 3/22* (2006.01)

(52) U.S. Cl. ............ 370/412; 370/442; 370/537; 370/538

(58) Field of Classification Search ........ 370/360, 370/412, 464, 498
See application file for complete search history.

(56) References Cited

U.S. PATENT DOCUMENTS

| | | | | |
|---|---|---|---|---|
| 5,214,638 A | * | 5/1993 | Norz et al. ............... | 370/358 |
| 5,953,258 A | * | 9/1999 | Thomann ............... | 365/189.17 |
| 5,978,355 A | * | 11/1999 | Yamaguchi ............. | 370/395.7 |
| 6,507,579 B1 | | 1/2003 | Gresham | |
| 6,693,903 B1 | * | 2/2004 | Shively .................. | 370/370 |
| 6,963,577 B1 | * | 11/2005 | Tomonaga et al. ........ | 370/412 |
| 7,266,128 B1 | * | 9/2007 | Goldhammer et al. ..... | 370/419 |

FOREIGN PATENT DOCUMENTS

| | | |
|---|---|---|
| GB | 2271448 A | 4/1994 |
| GB | 2366935 A | 3/2002 |
| JP | 4145565 A | 5/1992 |
| JP | 6046088 A | 2/1994 |
| WO | WO 97/13377 | 4/1997 |
| WO | 9841054 A1 | 9/1998 |

OTHER PUBLICATIONS

Kessner, D., Design of a time-slot-interchanger and other TDM bus interfacing issues, Mar. 21-28, 1998, vol. 4, pp. 515-521, Aerospace Conference, 1998, Proceedings, IEEE.*

* cited by examiner

*Primary Examiner*—Huy D Vu
*Assistant Examiner*—Asif H Khan
(74) *Attorney, Agent, or Firm*—Lawrence E. Laubscher, Jr.

(57) ABSTRACT

A time division multiplex switch supporting multi-rate input and output serial data streams has a double-buffered data memory with buffer extensions associated respectively with each portion of the memory. The extensions store residual data for a delay period after the main portion of the double-buffered data memory has switched.

19 Claims, 3 Drawing Sheets

DATA MEMORY EXTENSION FOR USE IN DOUBLE BUFFERED TDM SWITCHES

FIELD OF THE INVENTION

This invention relates to the field of data switching, and in particular to double buffered TDM (Time Division Multiplexed) switches.

BACKGROUND OF THE INVENTION

The fundamental operating principle of a double buffered data memory in a TDM switch that supports multi-rate input and output with programmable fractional delay, both of which are programmable on a per-stream basis, is that an entire frame of data is stored in one buffer, while an entire frame of data is played out from the other buffer. At the frame boundary, the buffers are logically switched, using hardware multiplexers on the address, data and control signals to the memories, and then the whole cycle repeats for subsequent frames. The switch described in U.S. Pat. No. 6,507,579, the contents of which are herein incorporated by reference, entitled Digital Switch with Rate Conversion works in this way. This switch is named PASIC, and will be subsequently referenced as such. A double buffered technique using a smaller memory is also described in reference U.S. Pat. No. 5,649,148 entitled Fast digital signal processor interface using data interchanging between two memory banks, the contents of which are herein incorporated by reference.

In the most ideal case, any data received during any particular frame can be switched, and appear on the output during the following frame. However, some of the switched data does not appear on the outputs until the duration of the second following frame for two reasons:
1. Data arriving at the very end of a frame cannot be read from its input shift register and loaded into the input memory buffer until after the start of the following frame.
2. Data being switched into timeslots at the very start of a frame must usually be loaded into their respective output shift registers before the start of the frame. For these reasons, some of the switched data is delayed by two frames.

A TDM switch that supports a constant delay feature will contain some kind of memory buffer used to store any data that would otherwise appear on the outputs in one frame and to delay that data by one frame. In this manner, all data received on any particular frame would then appear on the second frame following that on which it was received. Other ways of implementing a constant delay feature are possible. Examples of commercially available TDM switches that support this constant delay feature are Mitel MT8985 and MT8986 devices described in Mitel Semiconductor Digital Switching and Networking Components; Issue 11, 1997.

In the prior art, if there are multi-rate streams together with fractional delay, and these features are controllable on a per-stream basis, then the duration of the channel times will vary depending on the data rate and fractional delay setting, and so, therefore, the point in time that the data can be presented to the data memory buffer also varies. Because the data streams can have different rates or fractional delays programmed, there is no single point in time that the memory buffers can be logically switched and be guaranteed to contain one complete frame of data.

In a variable delay throughput TDM switch, it does not matter how many frames the data is delayed, so there is no problem. However, most modern TDM switches include a constant delay feature which demands that any data received during any particular frame will be available on the outputs during a frame that is a fixed number of frames later, regardless of the programmed connection path, or any other programmed features. Preferably, this number is two frames.

The most significant traditional technique to overcome this problem is to use a second data memory instance. Data memory buffers are switched at a single point in time, usually but not necessarily after the D1 data is received (See FIG. 1). The next frame data is stored in the second different data memory buffer. Each memory buffer may or may not contain exactly one complete frame of data, depending on the programmed data rates per stream.

A hardware unit is then used to appropriately select the data from one of the two data memory instances, depending on the connection path. The obvious disadvantage of this is the size of the extra memory instance. Also, this technique usually incurs an additional frame delay in the output.

Many lower bandwidth TDM switches do not use a double buffered data memory as described, but rather, they use multiple data memory instances, usually two or three, and a hardware switching unit that has sufficient time and performance to both store the input data, and read out the desired connection data for loading into the output serial shift registers in sequence.

While this technique may be advantageous from a hardware standpoint, in very large switches, for example, having 32,768 channels, this particular switching technique cannot be used because there is not enough time to execute both a data store sequence into the data memory, and a data recovery and switching sequence in the available time. The double buffered technique, as used in the PASIC significantly improves the through-put capability by logically separating the data storage portion of the switch from the data recall portion.

A third technique is to provide many smaller double buffered data memory segments, one each for each input stream, and then to appropriately switch each one at the point in time when they have collected exactly one frame of data. This technique works well, but incurs the disadvantage of having many small memory elements. Most SRAM implementations are less efficient at smaller sizes.

SUMMARY OF THE INVENTION

The invention provides a small data memory extension, just large enough to hold the maximum amount of data overrun that may happen because of slower programmed input rates and input bit delays.

According to the present invention there is provided a time division multiplex switch supporting multi-rate input and output serial data streams, comprising a plurality of input registers for receiving multiple serial input data streams; a plurality of output registers for outputting multiple serial output data streams; a data memory for temporarily storing data to be switched between said input and output streams, said data memory having a first and second main buffer portions for storing successive frames of data; a connection memory for storing connection paths for said switched data; a controller for switching between said first and second main buffer portions of said data memory; and first and second buffer extensions associated respectively with said first and second buffer portions for storing residual data, said controller being programmed to switch said first and second buffer extensions after a delay relative to the switching of said first and second main buffer portions.

This technique allows the use of a double buffered data memory in a TDM switch that supports multi-rate input and output with programmable fractional delay, both of which are programmable on a per-stream basis, in a TDM switch which supports a constant delay throughput feature. However, the invention is also applicable to systems that offer a variable delay where consistent handling of a frame of data is required.

The data memory is preferably a dual-port memory, although a single port memory can be employed. The buffer extensions are small conveniently SRAMs, for example, of 512 bytes.

The invention also provides a method of controlling a time division multiplex switch supporting multi-rate input and output serial data streams, comprising the steps of receiving multiple serial input data streams; providing a data memory for temporarily storing data to be switched between said input streams and output streams, said data memory having a first and second main buffer portions for storing successive frames of data, each said first and second main buffer portions being respectively associated with first and second buffer extensions for storing residual data; switching between said first and second main buffer portions of said data memory; and switching between said first and second buffer extensions after a delay relative to the switching between said first and second main buffer portions.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

Figure 1:
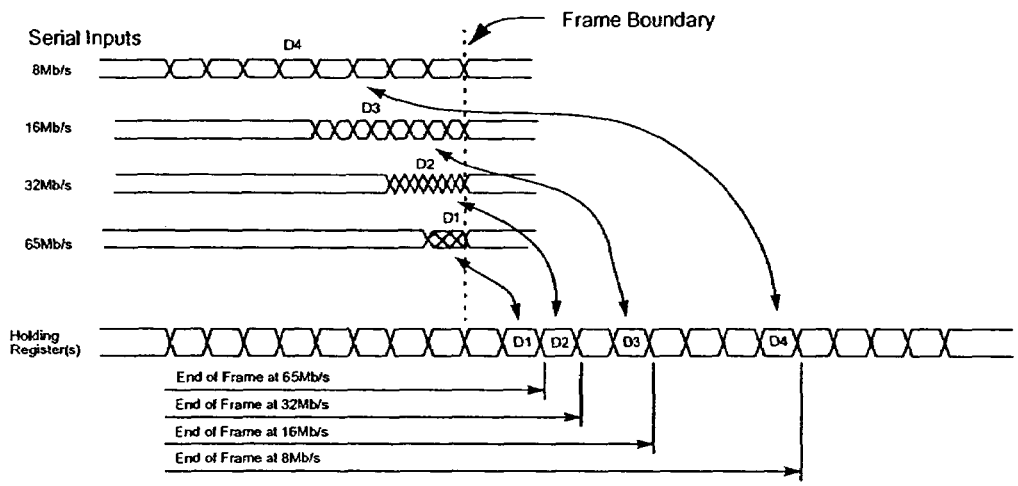
FIG. 1 is a timing chart showing data availability at variable bit rates.

Referring now to FIG. 1, the serial input data to the TDM switch is illustrated as serial input data streams D1, D2, D3, and D4. In this example, D1 shifts at 65 MB/s, D2 shifts at 32 MB/s, D3 shifts at 16 MB/s, and D4 shifts at 8 MB/s. The corresponding availability of these data is illustrated in the holding registers as shown. The illustrated serial data is in ST-BUS format, although this technique is not limited to just the ST-BUS.

As illustrated in FIG. 1, there are four points in time, relating to the holding register contents, where the end of frame would have to occur in order for the data memory to contain exactly one frame of data. If the data memory banks are switched after D1, then D2, D3, & D4 are stored in the subsequent data memory bank, which is not available for output until exactly the same time on the next frame. It can be shown that if D2, D3, and D4 are being switched to timeslot 0, then they won't be available for output until the third frame from when they were received, and this breaks the constant delay strategy of a two frame delay.

In a similar manner, if the data memory banks are switched after D4, then D1, D2, D3, and D4 are stored in the current data memory bank; however, other 65 Mb/s data is also stored from the new frame at the same time. It can be shown that this data then becomes available for output either on the same frame or the following frame, which again breaks the constant delay strategy of a two frame delay.

In accordance with the principles of the invention, the switch employs a main data memory with a small extension. The main memory stores all of the frame data as it becomes available in the holding register. The extension memory holds just the same frame data that becomes available after the main data memory buffer has switched. The data memory extension is large enough to store all the data received from the holding registers from D2 to D4, inclusive.

The main double buffered data memory switches on a frame boundary corresponding to the minimum settings, just after D1 is stored, and then any data from the same frame that is subsequently received as a result of slower programmed rates or input bit delays, D2 to D4, is stored in the data memory extension.

The double buffered data memory extensions do not switch at the same time as the main data memory, but rather, they switch at a time after the maximum amount of time that any data could be received from the same frame because of any programmed feature. In FIG. 1, the data memory extension buffers would switch after the D4 data has been stored.

In the preferred embodiment, the data memory extension is a small 512 byte memory that stores just the data from D2 to D4. In fact, only a 480 byte memory is actually required; however, it can be shown that the added complexity in addressing just a 480 byte memory is not worth the 32 bytes that would be saved.

While the main data memory is switched exactly after the D1 time-slot, the extension isn't switched until the end of the D4 time-slot. All the data received from D2 to D4 is stored in both the main data memory and the data memory extension.

When data is read from the data memories by the switching hardware, a logical decision is made, depending on the connection path, on whether to used the data from the main data memory or the data from the data memory extension, in order to guarantee the two frame delay for all possible connection paths.

Figure 2:
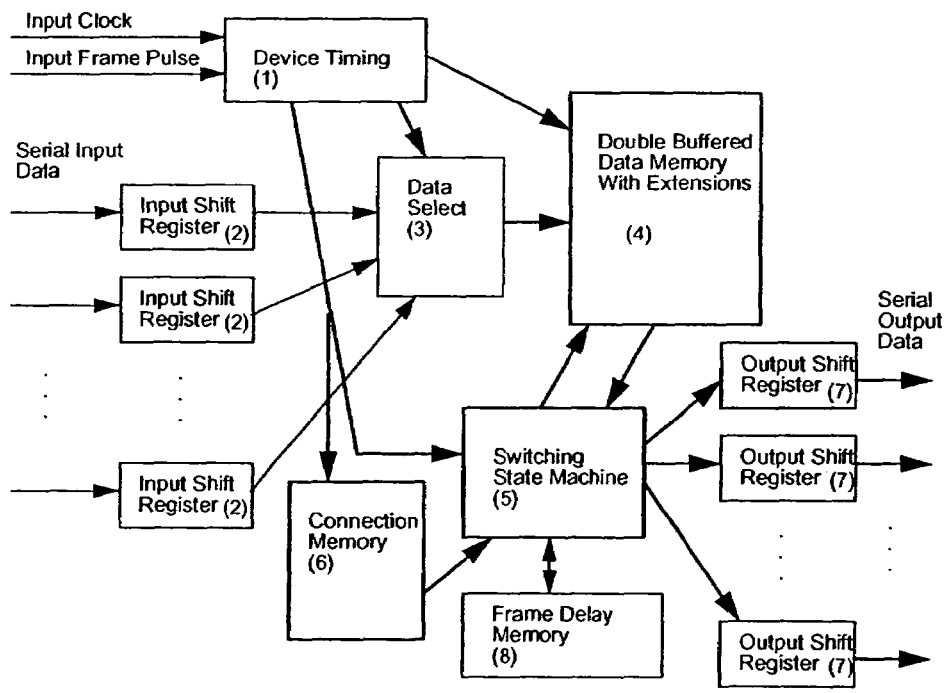
FIG. 2 is a functional block diagram of a basic TDM switch configuration.

FIG. 2 is a block diagram showing the major components of the TDM switch. A timing block 1, which usually contains binary counters, uses the primary Clock input and Frame Pulse input to establish a binary signal that accurately corresponds to the relative position within the current frame.

A plurality of input serial to parallel shift registers 2, each of which samples its corresponding input serial data, convert this data into an 8 bit parallel signal. Data select block 3 is essentially a large multiplexer, which takes as an input all of the parallel data from all of the serial input shift registers 2, and a binary timing signal from the timing block 1. The data select block 3 uses the signal from the timing block to sequentially select each of the 8-bit parallel signals from the input shift registers and apply them in sequence to the Double Buffered Data Memory with Extensions 4, where they are stored.

The Double Buffered Data Memory performs two main functions: It stores data from the data select block into the data memory; and, it reads back selected data from the data memory as directed by the Switching State Machine 5.

The Switching State Machine 5 provides all of the necessary signals to sequentially read a connection memory 6 for a connection address, apply that connection address to the data memory block 4, read a data byte from the data memory 4 from the connection address, and store that data byte into the parallel input of the output shift registers 7. This operation is performed repetitively during each time-slot, for each serial output stream, until all timeslots of all outputs have been loaded with data.

If a TDM switch has the constant delay feature, then the switching hardware may store the data into the frame delay memory 8, after it has read the data that was stored there on the previous frame. It does this to delay a datum by one frame in the situation where the data would otherwise appear on the output one frame early.

The switching state machine 5 reads the locations in the connection memory 6 to determine a connection address, and usually any other connection characteristics for a particular connection path. There is always a mechanism present to store data into the connection memory. This mechanism is not illustrated in FIG. 2. Most typically, it is a microprocessor interface port, as in the case of the commercial MT8985, & MT8986 devices referred to above, although, other types of interfaces are possible. The PASIC uses an HDLC message link to load the connection memory. Persons skilled in the art will know how to construct suitable interfaces to load a connection memory.

In output parallel-to-serial shift register 7, each block takes an 8-bit parallel data supplied from the switching state machine 5, and loads it into a serial shift register. It then sequentially shifts the loaded data onto the serial output.

All data received and switched by the Switching State Machine is stored in the Frame Delay Buffer Memory 8 at locations that correspond one-to-one with specific time-slots of specific serial output streams. In this example, this memory contains 32,768 bytes. Read and write operations are timed such that read operations will recover data that was stored on the previous frame, and write operations will over-write the data that was stored on the previous frame. It can be shown that this technique can be used to delay the output data for any particular timeslot of any particular output stream by one frame.

The block diagram illustrated in FIG. 2 illustrates a generic TDM digital switch, excepting the inclusion of the Data Memory with Extensions in accordance with the principles of the invention. Persons skilled in the art can develop this type of hardware, and, with the exception of the use of the data memory extensions, it similar to the technique that is used to perform the digital switching in the PASIC.

The method of providing the constant delay function, with the use of the Frame Delay Buffer Memory is not necessarily the only way to implement a constant delay feature. Devices like MT8985, & MT8986 use a very similar switching technique as that illustrated in FIG. 2, but these devices have a different method of implementing the constant delay feature.

The Data Memory Extension component is contained entirely in the Double Buffered Data Memory With Extensions block, and the corresponding data selection hardware is contained in the Switching State Machine 5.

Figure 3:
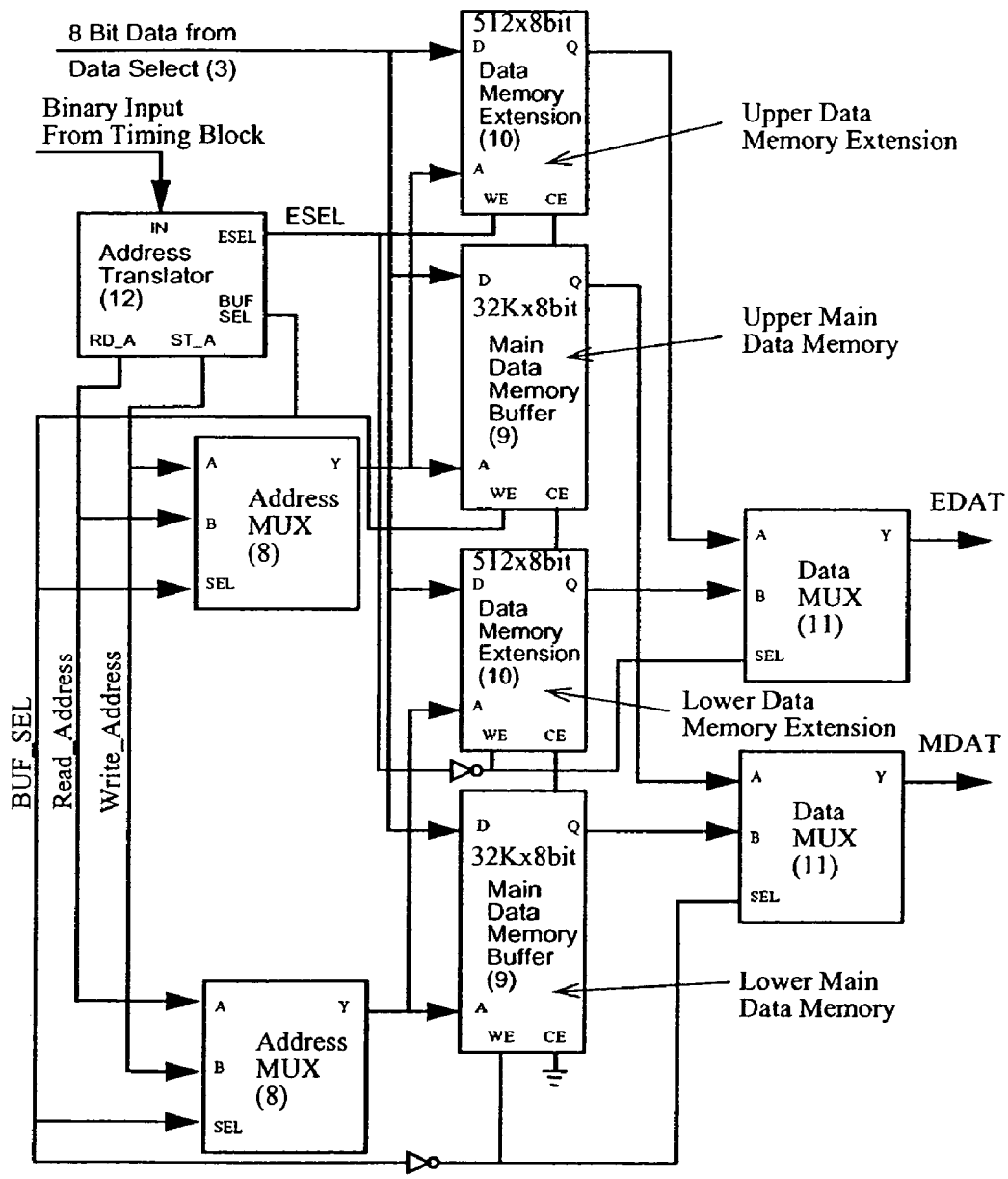
FIG. 3 is a block diagram of a data memory extension.

A block diagram of the data memory extension hardware is illustrated in FIG. 3. The indicated memory sizes correspond to those of the preferred embodiment. Also, this diagram does not illustrate any clock signals. Most synchronous memory circuits require a clock signal, which is assumed to be present and properly connected to the memory circuits. All of the inputs and outputs are synchronous to this clock signal. It is omitted from FIG. 3 to preserve the clarity of the illustration.

In FIG. 3, an Address Translator 12 receives a binary signal from the device timing block 1 in FIG. 2, and converts it into a read address signal, read_address, a write address signal, write_address, a buffer select signal, BUF_SEL, and an Extension Buffer select, ESEL. The Main Data Memory 9 is a generic SRAM cell, with a data input, D, a data output, Q, an address input A, an active low write enable input, WE (Active low is a well understood concept meaning that the described function is activated when the corresponding active low signal is set to a logic 0), and an active low device enable, CE. In the current embodiment, this memory size is 32,768 bytes, Data Memory Extension 10 is a generic SRAM cell, with a data input, D, a data output, Q, an address input A, an active low write enable input, WE, and an active low device enable, CE. In the current embodiment, this memory size is 512 bytes, Address MUX 8 is an address multiplexer, and Data MUX 11 is a data multiplexer. Both multiplexers 11 and 8 have a function consistent with that of any generic multiplexer. This is most easily described using the verilog[2] description: Y<=SEL ? B : A. See IEEE Standard 1364-1995—IEEE Standard Description Language Based on the Verilog Hardware Description Language.

The memory cells 9 and 10 have functions consistent with that of generic synchronous memories.

An examination of FIG. 3 shows that if the BUF_SEL signal is low, then the write_address is applied to the upper Main Data Memory 9, and the write enable of this memory, WE, is active low. In this state, the 8 Bit Data appearing at the data inputs D2 will be written into this memory. At the same time, the lower Main Data Memory 9 receives the read_address, and the write enable of this memory, WE, is inactive high. In this state, the memory is read, and the data passes through the data MUX 11 and appears at the MDAT output.

If the BUF_SEL signal is high, then the write_address is applied to the lower Main Data Memory 9, and the write enable of this memory, WE, is active low. In this state, the 8 Bit Data appearing at the data inputs D will be written into this memory. At the same time, the upper Main Data Memory 9 receives the read_address, and the write enable of this memory, WE, is inactive high. In this state, the memory is read, and the data passes through the data MUX 11 and appears at the MDAT output.

It can be shown that the BUF_SEL signal is used to logically switch the positions and operation of the Main Data Memories 9. This is substantially the technique that performs the storage of data in the PASIC.

In a likewise manner, an examination FIG. 3 shows that if the ESEL signal is low, then the write address is applied to the upper Data Memory Extension 10, and the write enable of this memory, WE, is active low. In this state, the 8 Bit Data appearing at the data inputs D will be written into this memory. At the same time, the lower Data Memory Extension 10 receives the read_address, and the write enable of this memory, WE, is inactive high. In this state, the memory is read, and the data passes through the data MUX 11, and appears at the EDAT output.

If the ESEL signal is high, then the write_address is applied to the lower Data Memory Extension 10, and the write enable of this memory, WE, is active low. In this state, the 8 Bit Data appearing at the data inputs D, will be written into this memory. At the same time, the upper Data Memory Extension 10 receives the read_address, and the write enable of this memory, WE, is inactive high. In this state, the memory is read, and the data passes through the data MUX 11, and appears at the EDAT output.

It can be shown that the ESEL signal is used to logically switch the positions and operation of the Data Memory Extensions 10.

Figure 4:
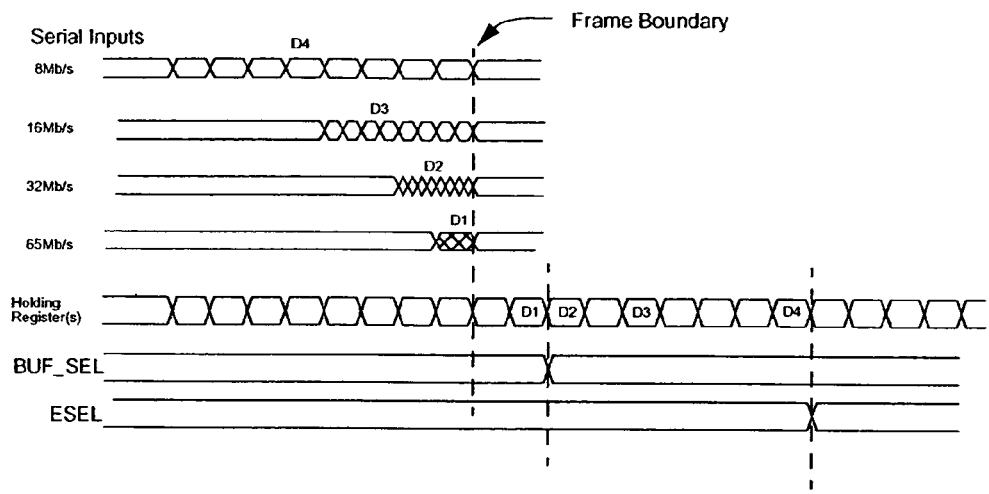
FIG. 4 is a timing chart for the memory extension.

The address translator 12 creates the address and control signals for entire Data Memory Extension block. The clearest description of the address translator is the verilog description as follows:

1. module address_translator(in, BUF_SEL, ESEL, RD_A, STA);
2. input [15:0] in;
3. output [14:0] ST_A, RD_A;

4. output BUF_SEL, ESEL;
5. wire [15:0] in;
6. wire [14:0] ST_A, RD_A;
7. wire BUF_SEL, ESEL;
8. wire [15:0] offset;
9. assign BUF_SEL=in[15],
10. ST_A=in[14:0],
11. RDA=in[14:0]+2,
12. offset=in−512,
13. ESEL=offset[15];
14. endmodule The most significant signal descriptions are those describing BUF_SEL and ESEL, lines 9 and 13 respectively. The timing of these signals as they occur in relation to those from FIG. 1 is illustrated in FIG. 4. These signals are illustrated as they occur in the preferred embodiment. The signal ESEL, affected by the number of input and/or output serial streams being processed, by number and duration of the individual timeslots, and very often by otherwise unrelated features.

Many variations of the preferred embodiment described are possible. It is possible to use two port memories, rather than the single port memories. This doubles the bandwidth through the switch without increasing the clock speed. An examination of FIG. 3 shows that two port memories could be added in place of the single port memories, and additional address and data multiplexers 11 and 13 could be connected to the second port to effectively double the throughput without changing the substance of the invention.

The Switching State Machine 5 illustrated in FIG. 2 is very heavily pipelined, and the Addresses translator 12 shown in FIG. 3 is a heavily pipelined synchronous circuit. In an experimental embodiment, the address translator is a combinatorial circuit as the verilog listing above implies, and some minor changes in memory addressing required changes in the verilog numerical translations. The resulting waveforms, BUF_SEL, and ESEL, as illustrated in FIG. 4, successfully establish the extended data memory operation.

Figure 5:
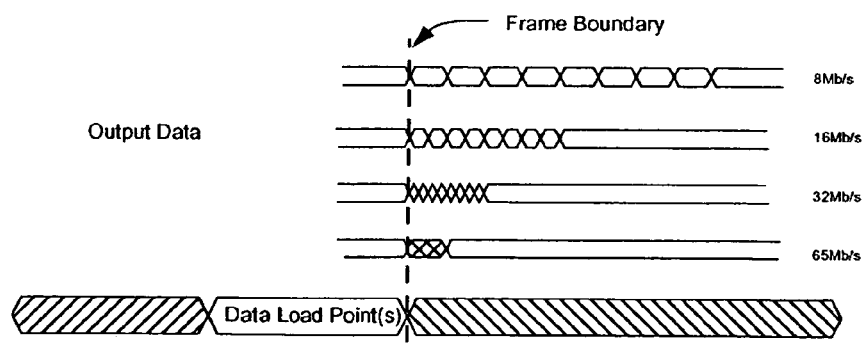
FIG. 5 is a chart showing the output shift register load timing.

In the Switching State machine 5 as illustrated in FIG. 2, a hardware decision is made to decide which byte, MDAT or EDAT, (referring to the two outputs of FIG. 3,) to use for storage into the output shift registers. MDAT is the data read from the Main Data Memory, and EDAT is read from the Data Memory Extension. Although the details of this transfer function can be very complex, depending on many other non-related features, the basic concept is quite simple to illustrate. For example, the Extended data memory achieves its purpose when the connection path is connecting D2, D3, or D4 data, (see FIG. 1), to the very first timeslots of a serial output data stream. The timing of this data transfer is illustrated in FIG. 5.

The above discussion illustrates one case where the data from the extended data memory must be selected for loading into the output shift register in order to preserve the two frame constant delay requirement. This is presented in an attempt to illustrate a clear case for conceptual purposes since even for someone skilled in the art it can be difficult to fully comprehend the delay characteristics from the serial inputs to the serial outputs, of this type of TDM switch.

The most general statement of the data selection rule for the selection of either the MDAT data from the main data memory, or the EDAT data from the extended data memory, is as follows: Any serial input data received during any specific frame, where, as a result of some feature, or some programmed input data rate, it arrives at the parallel output of the input shift register 2 at a point in time after the main input data memory buffer pointer, (BUF_SEL), has switched, but before the extended data memory buffer pointer, (ESEL), has switched, and also, if these specific data elements are connected through the TDM switch to a serial output time slot at or near the beginning of the frame boundary, such that, the data must be read from the data memory buffer for loading into the parallel input of the output shift register 7 at a point in time before the main input data memory buffer pointer, (BUF_SEL), has switched, then the switching hardware must choose the data from the extended data memory instead of the main data memory in order to preserve the two frame delay requirement.

The details of this transfer function can be very complex, depending on many other otherwise non-related features. In the preferred embodiment, the pipe-lining was one of the most significant complications of the implementation. However, in all cases, the general rule outlined above can consistently govern the flow of these special data paths in order to meet the two frame constant delay requirement.

There is a wide range of variations possible to the switching circuit illustrated in FIG. 2 and the extended data memory configuration illustrated in FIG. 3. These result primarily in the implementation of other non-related features. Although, the preferred embodiment used this invention to resolve the constant delay implementation resulting from multiple input and output streams, each having separately programmable rates and bit delays, any feature that results in the presentation of data from a specific frame at an inconsistent time at the end of the frame can use a data memory extension to the main data memory to hold this data.

Many variations are possible in the address memory connections, multiplexer sizes, and address translator design. Such variations may result from variations in the number of input streams and/or output streams, variations in the input and/or output data rates, the number of timeslots per stream, variations in features applied to each input and/or output stream, and any data transform functions that are applied to the data during switching.

All of these possibilities can affect the details of the implementation of the data memory extension while still employing the concept to maintain the constant delay throughput.

The data memory extension concept is not just limited to a double buffered data memory. The same technique may also be used on single buffered data memories, or multiple buffered memories. Also, the reasons for the implementation may not be confined only to a constant delay requirement. Any applications that require the consistent handling of a frame of data where the switch point cannot be consistently exercised because of variations in the input characteristics may use this type of data memory extension hardware, and are therefore within the scope of this invention.

I claim:

1. A time division multiplex switch supporting multi-rate input and output serial data streams, comprising:
   a plurality of input registers for receiving multiple serial input data streams having different data rates ranging from the fastest to the slowest;
   a plurality of output registers for outputting multiple serial output data streams;
   a data memory for temporarily storing data to be switched between said input and output streams, said data memory having a first and second main buffer portions for storing successive frames of data;
   a connection memory for storing connection paths for said switched data;
   a controller for switching data from said input data streams between said first and second main buffer portions of said data memory at a first frame boundary determined by said input stream with the fastest data rate; and first and second buffer extensions associated respectively with said first and second buffer portions for storing residual frame data from the remaining input data streams in the same frame and arriving after said first frame boundary, said first and second buffer extensions having a smaller memory size than said main buffer portions, said controller being programmed to switch said first and second buffer extensions at a second frame boundary determined by the input stream with the slowest data rate.

2. A time division multiplex switch as claimed in claim 1, further comprising a logic unit for determining whether to use data from said first and second main buffer portions or said buffer extensions to ensure a specific frame delay for all possible connection paths.

3. A time division multiplex switch as claimed in claim 2, wherein said specific frame delay is a fixed delay.

4. A time division multiplex switch as claimed in claim 3, wherein said fixed delay is a two-frame delay.

5. A time division multiplex switch as claimed in claim 2, wherein said logic unit includes a switching state machine that reads data from said data memory at an address determined by said connection memory.

6. A time division multiplex switch as claimed in claim 5, wherein switching state machine reads data from said data memory into a frame delay memory.

7. A time division multiplex switch as claimed in claim 6, wherein said data is stored in said frame delay memory at locations that correspond one-for-one with specific time-slots of serial output streams.

8. A time division multiplex switch as claimed in claim 5, wherein said switching state machine generates a pair of select signals for respectively selecting one of said main buffer portions and one of said buffer extensions.

9. A time division multiplex switch as claimed in claim 8, wherein said switching state machine is programmed to ensure that where any serial input data received during any specific frame arrives at the output of the input shift register at a point in time after the main buffer portion has switched, but before the associated buffer extension has switched, and if these specific input data are connected to a serial output time slot at or near the beginning of a frame boundary, such that the data must be read from the data memory for loading into the input of an output shift register at a point in time before said main buffer portions have switched, then the data is read from the associated buffer extension instead of said main buffer portion in order to preserve said specific frame delay.

10. A time division multiplex switch as claimed in claim 8, wherein said select signals are generated by an address translator.

11. A time division multiplex switch as claimed in claim 10, wherein said address translator is a combinatorial circuit.

12. A time division multiplex switch as claimed in claim 1, wherein said data memory is a dual port memory.

13. A time division multiplex switch as claimed in claim 1, wherein said buffer extensions are SRAMs.

14. A time division multiplex switch as claimed in claim 13, wherein said buffer extensions are 512 bytes.

15. A method of controlling a time division multiplex switch supporting multi-rate input and output serial data streams, comprising the steps of:
receiving multiple serial input data streams having different data rates ranging from the fastest to the slowest;
providing a data memory for temporarily storing data to be switched between said input streams and output streams, said data memory having a first and second main buffer portions for storing successive frames of data, each said first and second main buffer portions being respectively associated with first and second buffer extensions having a size smaller than said first and second main buffer portions for storing residual data;
switching between said first and second main buffer portions of said data memory at a first frame boundary determined by the input stream with the fastest data rate; and
switching said first and second buffer extensions at a second frame boundary determined by said slowest data stream whereby data from the data input streams other than the fastest input stream and arriving after the first frame boundary is stored in the buffer extension associated with the main buffer portion storing the rest of that frame.

16. A method as claimed in claim 15, wherein data is read from either said main buffer portions or said buffer extensions as necessary to ensure a specific frame delay for all possible connection paths.

17. A method as claimed in claim 16, wherein said specific frame delay is a fixed delay.

18. A method as claimed in claim 17, wherein said fixed delay is a two-frame delay.

19. A method as claimed in claim 16, wherein the switching occurs in such a way as to ensure that where any serial input data received during any specific frame arrives at the output of the input shift register at a point in time after the main buffer portion has switched, but before the associated buffer extension has switched, and if these specific input data are connected to a serial output time slot at or near the beginning of a frame boundary, such that the data must be read from the data memory for loading into the input of an output shift register at a point in time before said main buffer portions have switched, then the data is read from the associated buffer extension instead of said main buffer portion in order to preserve said specific frame delay.

* * * * *